United States Patent [19]

Callan et al.

[11] 4,127,545

[45] Nov. 28, 1978

[54] HOT MELT CROSSLINKED BUTYL SEALANT

[75] Inventors: John E. Callan, Broken Arrow, Okla.; Eric L. Scheinbart, Copley, Ohio

[73] Assignee: Cities Service Company, Tulsa, Okla.

[21] Appl. No.: 819,446

[22] Filed: Jul. 27, 1977

Related U.S. Application Data

[63] Continuation-in-part of Ser. No. 689,022, May 24, 1976, abandoned.

[51] Int. Cl.² ............................................. C08L 93/00
[52] U.S. Cl. ............................... 260/27 BB; 260/845; 260/887

[58] Field of Search .................... 260/27 BB, 845, 887

[56] References Cited

U.S. PATENT DOCUMENTS

| | | | |
|---|---|---|---|
| 3,630,980 | 12/1971 | Russell | 260/37 EV |
| 3,674,735 | 7/1972 | Callan | 260/33.6 |

*Primary Examiner*—Lewis T. Jacobs
*Attorney, Agent, or Firm*—Patricia J. Hogan

[57] ABSTRACT

Hot melt sealant compositions having improved adhesive bonding properties comprise a slightly crosslinked butyl rubber and critically-controlled amounts of a crystalline polymeric resin and a tackifying resin.

3 Claims, No Drawings

HOT MELT CROSSLINKED BUTYL SEALANT

CROSS-REFERENCE TO RELATED APPLICATION

This application is a continuation-in-part of copending application Ser. No. 689,022, May 24, 1976, now abandoned.

BACKGROUND OF THE INVENTION

1. Field of the Invention

This invention relates to sealant compositions and more particularly relates to hot melt sealants based on crosslinked butyl rubber.

2. Description of the Prior Art

It is known that sealant compositions can be used in various automotive and construction applications as barriers to prevent the passage of water, moisture, air, gases, dirt, dust, etc., from one surface to another. Most known sealants have some effectiveness in this regard, but some - notably the butyl sealants - have better barrier properties than the others.

A disadvantage of known butyl sealants is that they are not particularly effective in imparting structural strength to the adhering substrates, and structural stength must therefore be provided by appropriate design and engineering of the components. The bond strength can be improved by using a hot melt sealant instead of the conventional sealants that are applied at room temperature, but even the hot melt sealants of the prior art do not have sufficient strength to impart structural and dimensional strength to sibstrates combined therewith.

SUMMARY OF THE INVENTION

An object of this invention is to provide novel hot melt butyl sealant compositions.

Another object is to provide such compositions having good bond strength.

These and other objects are attained by the provision of a hot melt sealant composition (a) a slightly crosslinked butyl rubber compound having a Mooney viscosity (ML 1+3 at 260° F.) of 55±5, (b) about 25–200 phr of a crystalline polymeric resin, and (c) about 25–200 phr of a tackifying resin. This composition has a high adhesive bonding property, measured as a yield strength of about 60–350 psi at room temperature.

DESCRIPTION OF THE PREFERRED EMBODIMENTS

The slightly crosslinked butyl rubber compound of the invention can be any such compound having a Mooney viscosity (ML 1+3 at 260° F.) of 55±5. However, it is preferably one of the crosslinked butyl rubber compounds of U.S. Pat. No. 3,674,735, e.g., a semi-vulcanized butyl compound obtained by mixing raw butyl rubber with a bromomethyl alkylated phenol-formaldehyde resin and polybutene in a Banbury mixer, a semi-vulcanized compound obtained by masticating a mixture of rubber process oil, diatomaceous earth, and phenol-formaldehyde resin with raw butyl rubber, etc. It is conveniently employed in pellet form.

The resin providing the crystalline polymeric resin of the invention can be any of the crystalline or crystallizable polymeric resins conventionally employed in sealant compositions. It may be compatible or incompatible with the other ingredients and, when not already crystalline, crystallizes while being processed with the other ingredients. Exemplary of such polymeric resins are polyethers, such as poly(alkylene oxides); polyesters, such as block polyesterpolyether copolymers; polyamides, such as reaction products of dimer acids and linear diamines; polyolefins, such as polypropylene; ethylene-ethyl acrylate copolymers; ethylene-vinyl acetate copolymers, etc., and mixtures thereof. A more complete compilation of utilizable polymeric resins can be found in TAPPI CA Report No. 37 (October, 1971). This ingredient must be employed in a concentration of about 25–200 phr if sealant compositions having the desired properties are to be obtained. Preferably it it used in a concentration of about 50–150 phr, most preferably about 100 phr.

The tackifying resin of the invention may be any one or more of the tackifying resins disclosed in TAPPI CA Report No. 37 (October, 1971). However, it is usually a hydrocarbon resin, such as a polystyrene, a vinyltoluene-alpha-methylstyrene copolymer, a polyterpene, a petroleum-derived aliphatic hydrocarbon resin, etc.; a phenolic resin, such as a modified alkylphenol-formaldehyde resin, a thermoplastic terpene phenolic resin, etc.; a coumarone-indene resin; natural rosin; a modified rosin, such as a glycerol ester of polymerized rosin, etc., and mixtures thereof. this ingredient must be employed in a concentration of about 25–200 phr if sealant compositions having the desired properties are to be obtained. However, since it can function as a softener, flexibilizer, or viscosity adjuster as well as enhancing the adhesion and tack of the composition, its concentration can be varied within this range to adapt the composition for various applications in which varying properties are desired. The concentration is preferably in the range of about 50–150 phr, most preferably about 100 phr.

The compositions of the invention do not require the incorporation of other conventional sealant composition additives for the attainment of the desired properties. However, such additives, e.g., fillers, pigments, extenders, etc., can be incorporated by the ultimate applicator if desired.

The ingredients of the compositions of the invention can be mixed by any of the suitable techniques conventionally employed in the rubber and sealant industries. For example, they can be put into a heated mixer, such as a sigma blade mixer, and mixed to homogeneity. The finished composition can be stored or used immediately.

The following examples are given to illustrate the invention and are not intended as a limitation thereof. Unless otherwise specified, quantities mentioned are quantities by weight.

EXAMPLE I

Prepare a hot melt sealant composition from the following recipe:

| Ingredient | Parts |
| --- | --- |
| Slightly crosslinked butyl rubber of U.S. Pat No. 2,674,735 having a Mooney viscosity (ML 1+3 at 260° F.) of 55 ± 5* | 100 |
| Ethylene-vinyl acetate copolymer** | 100 |
| Poly-beta-pinene tackifying resin | 100 |

*Hereinafter designated as SCBR
**Hereinafter designated as EVA

Add the SCBR and EVA to a sigma blade mixer heated to 290° F. Mix for about 20 minutes to homogeneity. Then incrementally add the poly-beta-pinene tackifying resin over a period of 20 minutes, mix for an additional 10 minutes, and dump the batch. The resultant composition has the following properties:

| | |
|---|---|
| Compression at 150° F. | 85 lbs./cu. in. |
| Room temperature yield strength (glass-glass, applied at 350° F.) | 58 psi |

EXAMPLE II

Repeat Example I except for replacing the 100 parts of poly-beta-pinene tackifying resin with 100 parts of thermoplastic terpene phenolic tackifying resin. The resultant composition has the following properties:

| | |
|---|---|
| Compression at 150° F. | 192 lbs./cu. in. |
| Room temperature yield strength (glass-glass, applied at 350° F.) | 80 psi |

EXAMPLE III

Repeat Example II except for reducing the amount of EVA to 50 parts and increasing the amount of terpene phenolic resin to 150 parts. The resultant composition has the following properties:

| | |
|---|---|
| Compression at 150° F. | 200 lbs./cu. in. |
| Compression at 100° F. | 230 lbs./cu. in. |
| Room temperature yield strength (glass-glass, applied at 350° F.) | 94 psi |
| Room temperature yield strength (glass-glass, applied at 300° F.) | 167 psi |

EXAMPLE IV

Repeat Example II except for reducing the amount of EVA to 25 parts. The resultant composition has the following properties:

| | |
|---|---|
| Compression at 150° F. | 100 lbs./cu. in. |
| Room temperature yield strength (unprimed aluminum, applied at 350° F.) | 68 psi |

EXAMPLE V

Repeat Example II except for increasing the amounts of EVA and terpene phenolic resin to 200 parts each. The resultant composition has the following properties:

| | |
|---|---|
| Compression at 100° F. | 465 lbs./cu. in. |
| Room temperature yield strength (unprimed aluminum, applied at 350° F.) | 58 psi |

EXAMPLE VI

Repeat Example III except for replacing the 150 parts of terpene phenolic resin with 150 parts of a glycerin ester of polymerized rosin. The resultant composition has the following properties:

| | |
|---|---|
| Compression at 100° F. | 126 lbs./cu. in. |
| Room temperature yield strength (glass-glass, applied at 300° F.) | 333 psi |

As demonstrated above, excellent properties, including exceptional yield strength, are obtained with compositions of the invention. Similar results are achieved when (1) the proportionation of components is varied within the permissable ranges of about 25-200 phr of crystalline resin and about 25-200 phr of tackifying resin, (2) the crystalline polymer of the preceding examples is replaced by a saturated polyester elastomer, an amorphous polypropylene, an ethylene-vinyl acetate copolymer, an ethylene-ethyl acrylate copolymer, or any of the other crystalline polymers taught to be useful in this specification, and/or (3) the tackifying resins of the preceding examples are replaced by polystyrene, a vinyltoluenealpha-methylstyrene copolymer, a glycerin, methyl, or pentaerythritol ester of hydrogenated rosin, or any of the other tackifying resins taught to be useful in this specification.

The following examples illustrate the poorer yield strengths obtained when the proportionation of components is not controlled within the permissable limits or when typical prior art recipes are used.

EXAMPLE VII - CONTROL

Repeat Example II except for increasing the amount of EVA to 400 parts. The resultant composition has a room temperature yield strength (unprimed aluminum, applied at 350° F.) of only 22 psi.

EXAMPLE VIII - CONTROL

Repeat Example II except for increasing the amount of terpene phenolic resin to 400 parts. The resultant composition has a room temperature yield strength (unprimed aluminum, applied at 350° F.) of only 12 psi.

EXAMPLE IX - CONTROL

Prepare a conventional sealant composition from 100 parts of the SCBR of Example I, 90 parts of carbon black, 35 parts of polybutene, and 30 arts of paraffinic oil. The resultant composition has a room temperature yield strength (glass-painted steel, applied at room temperature) of only 16.

Similar results are obtained with other prior art sealants, as is apparent from the properties mentioned in U.S. Pat. No. 3,674,725.

It is obvious that many variations can be made in the products and processes set forth above without departing from the spirit and scope of this invention.

What is claimed is:

1. A hot melt sealant composition having a yield strength of about 60-350 psi at room temperature and comprising (a) a slightly crosslinked butyl rubber compound having a Mooney viscosity (ML 1+3 at 260° F.) of 55±5, (b) about 25-200 phr of a crystalline polymeric resin selected from the group consisting of ethylene-ethyl acrylate copolymers and ethylene-vinyl acetate copolymers, and (c) about 25-200 phr of a tackifying resin selected from the group consisting of hydrocarbon resins, phenolic resins, coumarone-indene resins, and natural and modified rosins.

2. The composition of claim 1 wherein the concentrations of crystalline and tackifying resins are each about 50-150 phr.

3. The composition of claim 2 wherein the concentrations of crystalline and tackifying resins are each about 100 phr.

* * * * *